(12) United States Patent
Valentine

(10) Patent No.: US 11,495,068 B1
(45) Date of Patent: Nov. 8, 2022

(54) PACKAGE DELIVERY SYSTEM AND METHOD OF USE

(71) Applicant: Quinn Valentine, Conroe, TX (US)

(72) Inventor: Quinn Valentine, Conroe, TX (US)

(*) Notice: Subject to any disclaimer, the term of this patent is extended or adjusted under 35 U.S.C. 154(b) by 0 days.

(21) Appl. No.: 17/462,874

(22) Filed: Aug. 31, 2021

Related U.S. Application Data

(63) Continuation-in-part of application No. 17/228,096, filed on Apr. 12, 2021.

(51) Int. Cl.
*G07C 9/00* (2020.01)
*G06Q 10/08* (2012.01)

(52) U.S. Cl.
CPC ..... *G07C 9/00309* (2013.01); *G06Q 10/0833* (2013.01); *G07C 9/00896* (2013.01); *G07C 2009/00436* (2013.01); *G07C 2009/00515* (2013.01); *G07C 2009/00928* (2013.01)

(58) Field of Classification Search
CPC ....................................................... G07C 9/00
See application file for complete search history.

(56) References Cited

U.S. PATENT DOCUMENTS

| | | | | |
|---|---|---|---|---|
| 7,165,595 | B2* | 1/2007 | Yamamoto | E05F 11/54 160/97 |
| 9,388,631 | B2* | 7/2016 | Woeltjen, Jr. | E06B 5/11 |
| 10,588,440 | B1* | 3/2020 | Kajgana | A47G 29/28 |
| 10,878,647 | B2* | 12/2020 | Kane | A47G 29/141 |
| 2014/0190081 | A1* | 7/2014 | Wanjohi | E06B 1/52 49/25 |
| 2018/0228310 | A1* | 8/2018 | Enobakhare | A47G 29/1207 |
| 2021/0082219 | A1* | 3/2021 | Kane | E06B 7/32 |
| 2021/0324672 | A1* | 10/2021 | Altiner | G07C 9/28 |

* cited by examiner

*Primary Examiner* — K. Wong
(74) *Attorney, Agent, or Firm* — Leavitt Eldredge Law Firm

(57) ABSTRACT

A package delivery system for secured delivery of packages without the need for a person to be present to accept them in person is disclosed. The package delivery system includes a vertical structure such as a wall, a door, and a garage door; a package delivery door dispositioned within the vertical structure; and one or more user devices in communication with the package delivery door via a network.

1 Claim, 7 Drawing Sheets

PACKAGE DELIVERY SYSTEM AND METHOD OF USE

BACKGROUND

1. Field of the Invention

The present invention relates generally to package delivery systems, and more specifically to a package delivery system that utilizes a package delivery door to provide secured delivery of packages when no one is present to accept packages.

2. Description of Related Art

Package delivery systems are well known in the art and are effective means to carry and deliver shipping containers, parcels, mail, and the like. Commonly in the art, package delivery systems are used by online retailers to send packages of their products to their customers. Over the last decade, online shopping has increased in volume exponentially, resulting in the increased demand for package delivery systems.

One of the problems commonly associated with package delivery systems is their lack of security. For example, packages are often dropped off on a doorstep or other entryway when no one is available to accept them in person. As a result, packages are left unsupervised and thus are vulnerable to theft by porch pirates. While there have been attempts at ensuring the secured delivery of packages, such as leaving packages at a monitored package facility for the recipient to accept, these attempts are often extremely inconvenient for the recipient. For example, recipients are often required to travel to the package facility to pick up their package in person during store hours, which may clash with the recipient's schedule.

Hence, it would be advantageous to have a system and method that provides for secured delivery of packages without the need for a person to be present to accept them in person, thereby providing for improving user convenience.

Accordingly, although great strides have been made in the area of package delivery systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
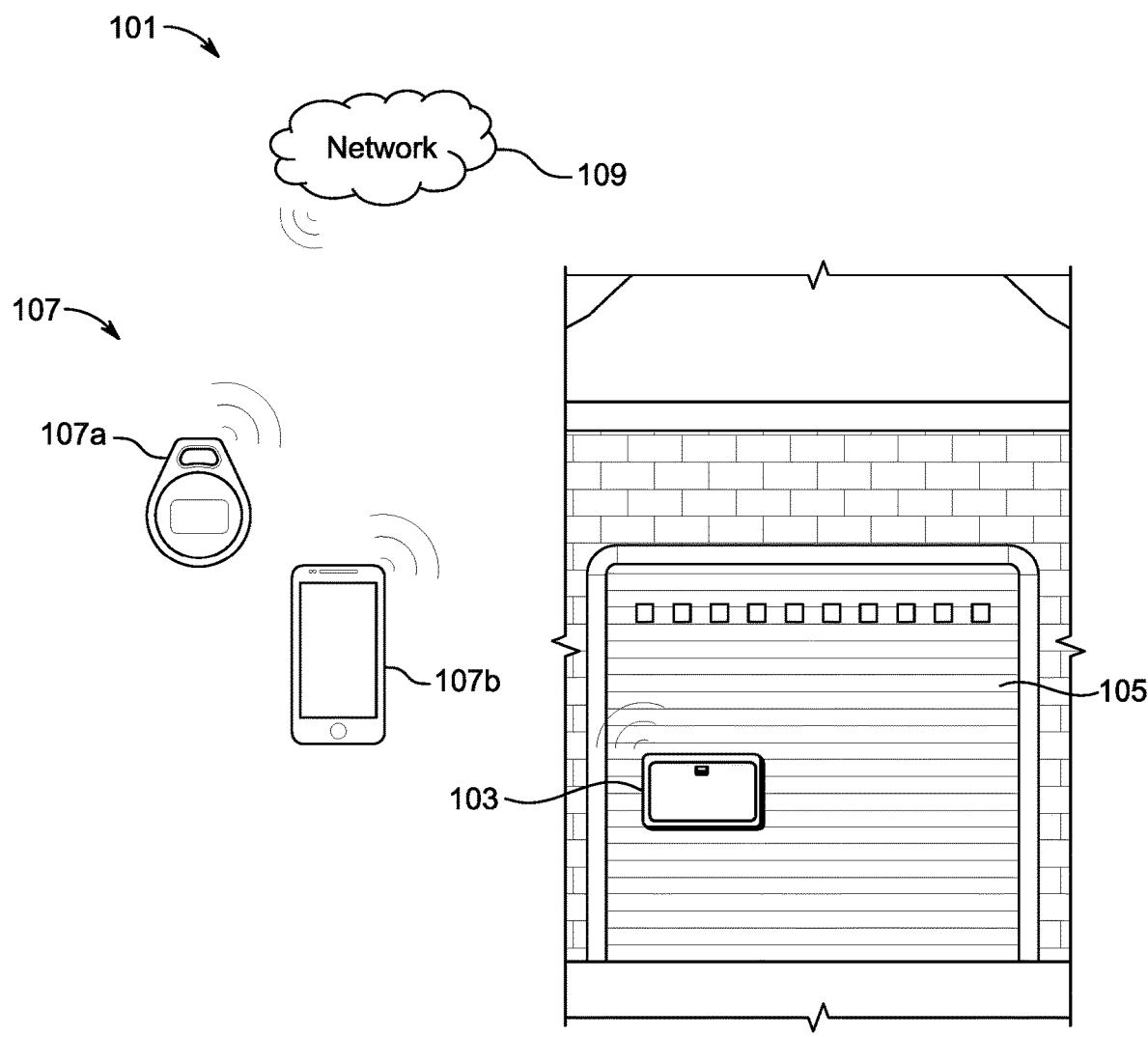
FIG. 1. is a schematic of a package delivery system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional package delivery systems. Specifically, the system of the present invention provides for a means to deliver packages securely without the need for a person to be present to accept the packages in person. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic of a package delivery system 101 in accordance with a preferred embodiment of the present application. It will be appreciated that the package delivery system 101 overcomes one or more of the above-listed problems commonly associated with conventional package delivery systems. In addition, it should be appreciated that the package delivery system 101 may vary based on aesthetical, functional, or manufacturing considerations.

In the contemplated embodiment, the package delivery system 101 includes a package delivery door 103 installed inside a vertical structure 105 such as a wall or door (e.g., a garage door as shown in FIG. 1). The package delivery door 103 is configured to be openable and closeable to allow packages to pass therethrough. It should be appreciated that the package delivery door 103 may be integrally formed as a unitary, one-piece construction with the vertical structure 105. Likewise, it should be appreciated that the package delivery door 103 may be separately formed and engaged with the vertical structure 105. In addition, it should be appreciated that although the package delivery door 103 is shown on the bottom portion of the vertical structure 105, it is contemplated that the package delivery door 103 could vary in location, size, style, and the like. Further, it should be appreciated that the vertical structure 105 can vary in orientation, configuration, and the like. For example, the vertical structure 105 can include a hinged door, a sliding door, a folding door, a pivot door, a flush-wall door, etc.

The package delivery system 101 also includes one or more user devices 107 in communication with the package delivery door 103 via a network 109. It should be appreciated that the one or more user devices 107 may be embodied in other systems such as a key fob 107a, a smart phone 107b, a radio-frequency identification (RFID) card (not shown), a key chain, a keypad lock, other hand-held device, or any other device suitable to facilitate communication with the package delivery door 103.

The network 109 may include one or more wired telecommunications, wireless telecommunications, or any combination or multiplicity thereof by which the one or more user devices 107 may communicate with the package delivery door 103. The network 109 may include, for example, one or more of a local area network (LAN), a wide area network (WAN), an intranet, an Internet, a public switched telephone network (PSTN), a metropolitan area network (MAN), a cellular or other mobile communication network, a BLUETOOTH® wireless technology connection, a wireless local area network (WLAN), a virtual private network (VPN) a near field communication (NFC) connection, and any combination or multiplicity thereof.

Figure 2A:
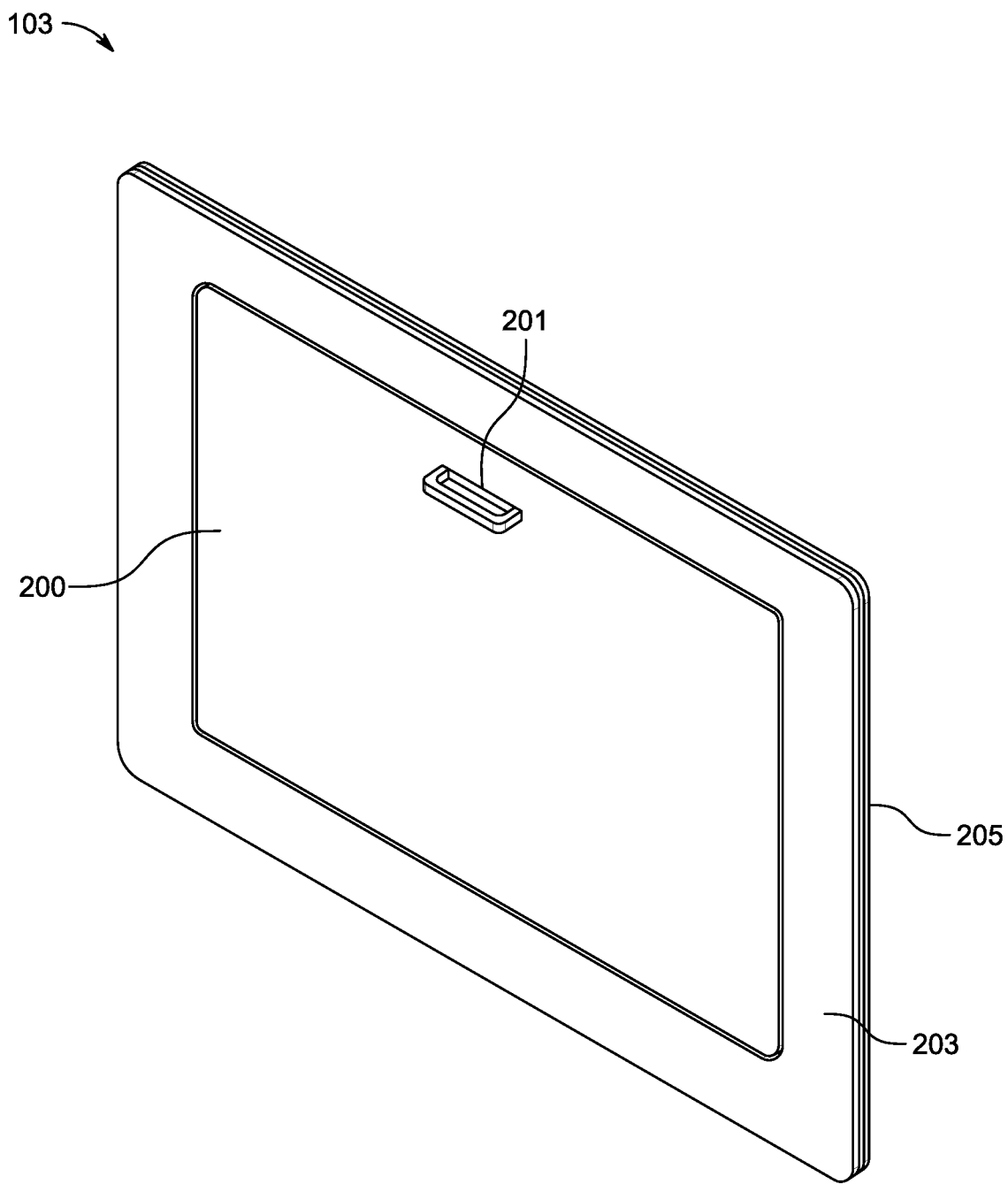
FIG. 2A is a perspective view of the package delivery door of FIG. 1 in a closed configuration in accordance with one or more aspects of the present application.
Figure 2B:
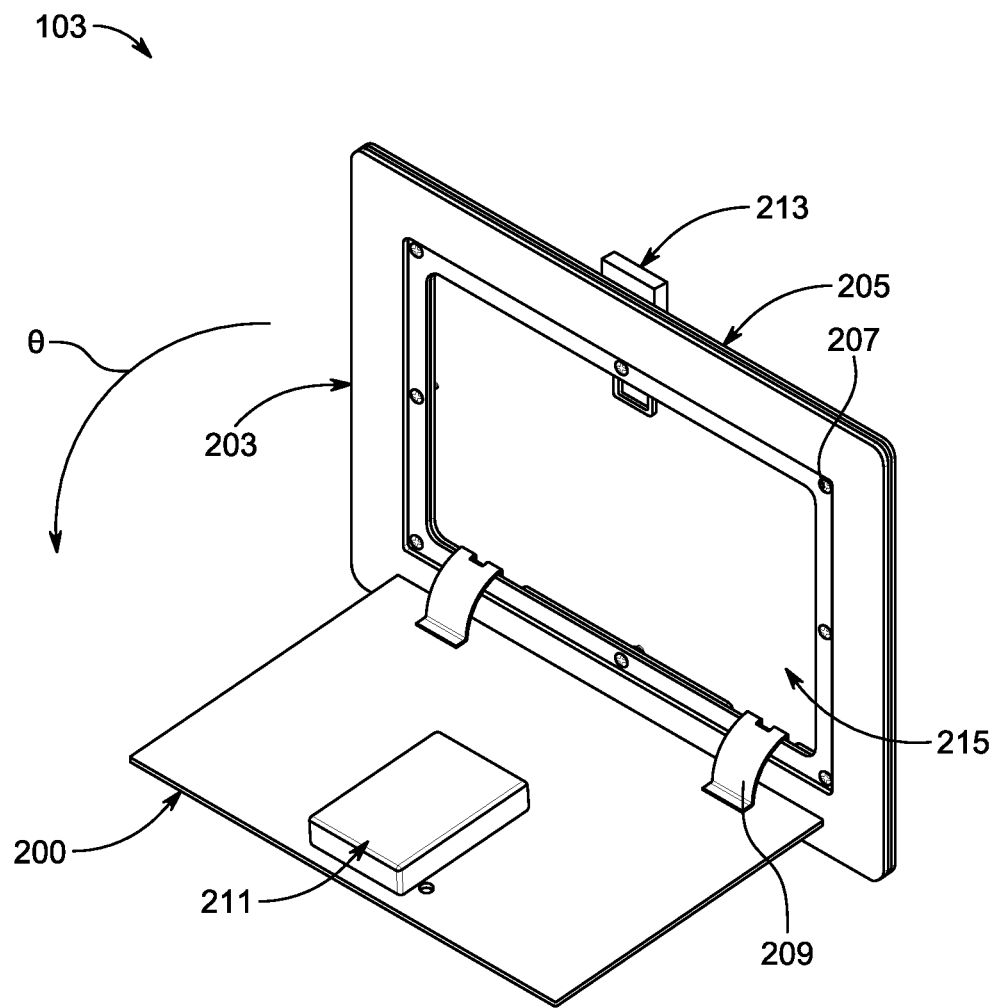
FIG. 2B is a perspective view of the package delivery door of FIG. 1 in an open configuration in accordance with one or more aspects of the present application.

In FIGS. 2A and 2B, perspective views of the package delivery door 103 in a closed and open configuration, respectively, are depicted. The package delivery door 103 includes a door panel 200, a handle 201, an exterior frame 203, an interior frame 205, one or more fasteners 207, and one or more hinges 209. The exterior frame 203 and the interior frame 205 are configured to define a door opening 215 to allow the insertion of one or more packages.

The one or more hinges 209 are configured to allow the door panel 200 to open at an angle (0), preferably at 105 degrees, and close flush with the exterior frame 203. It should be appreciated that although the one or more hinges 209 is shown along the bottom portion of the package delivery door 203, it is contemplated that the one or more hinges 209 may vary in location to facilitate the opening and closing of the door panel 200.

It should also be appreciated that the one or more fasteners 207 may include, without limitation, bolts, rivets, nails, screws, other fasteners, or any combination or multiplicity thereof.

The package delivery door 103 also includes a controller 211 and a latch 213. The controller 211 is configured to engage and disengage the latch 213 based on communication received from the one or more user devices 107. It should be appreciated that the controller 211 may include one or more user settings (not shown) that a recipient can choose from to control timing of the engagement and disengagement of the latch 213. For example, a recipient may select an auto-lock setting that directs the controller 211 to engage the latch 213 once the door panel 200 closes. In another example, a recipient may select a setting that directs the controller to engage the latch 213 thirty seconds after the door panel 200 closes 213.

In some embodiments, it should be appreciated that during use, when a delivery person having the one or more user devices 107 is in proximity to the package delivery door 103, the controller 211 directs the latch 213 to disengage, thereby allowing the delivery person to open the package delivery door 103. The delivery person may insert one or more packages through the door opening 215 and then close the package delivery door 103. Once closed, the controller 211 directs the latch to engage.

In alternative embodiments, it should be appreciated that during use, when a delivery person does not have the one or more user devices 107, the recipient may employ his or her user device, such as smart phone 107b, to remotely disengage the latch 213. Once the latch is disengaged, the delivery person may open the package delivery door 103 and insert one or more packages through the door opening 215.

In some embodiments, it should be appreciated that during use, the recipient may require the delivery person to engage the latch 213 after delivering one or more packages through the package delivery door 103 via the one or more user devices 107.

It should also be appreciated that one of the unique features believed characteristic of the present application is that the one or more user devices 107 and the controller 211 eliminate the need for a person to be present physically to accept packages and allow packages to be delivered securely.

Figure 3:
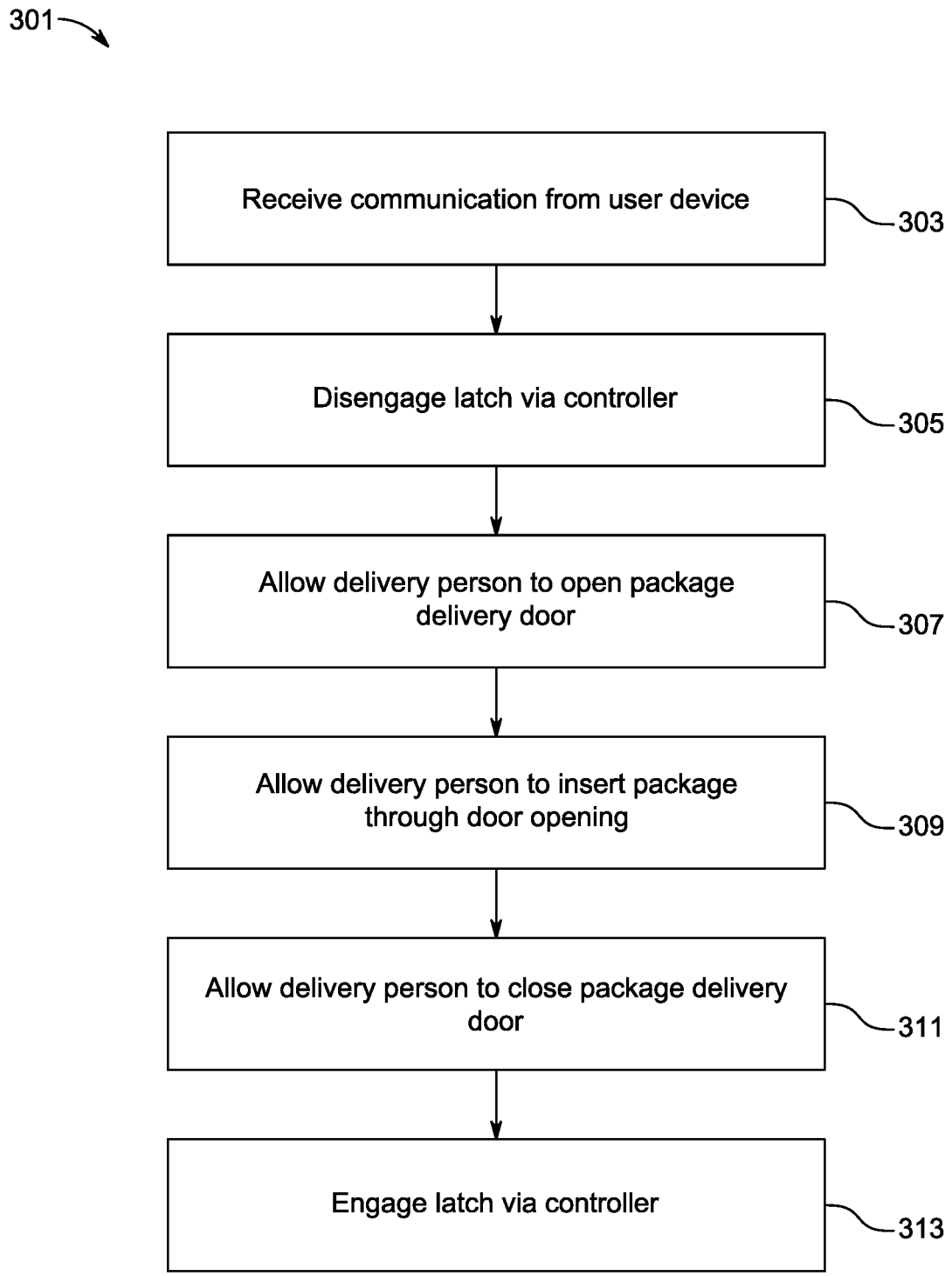
FIG. 3 is a flowchart of a method of use of the package delivery system of FIG. 1.

In FIG. 3, a flowchart 301 depicts a simplified method of use associated with the package delivery system 101. During use, when communication from the one or more user devices is received, the controller disengages the latch, as shown with boxes 303, 305. The delivery person may then open the package delivery door, insert one or more packages through the door opening, and close the package delivery door, as shown with boxes 307-311. The controller then engages the latch, as shown with box 313. It should be appreciated that the engagement of the latch may be based upon the one or more user settings selected by the recipient.

Figure 4A:
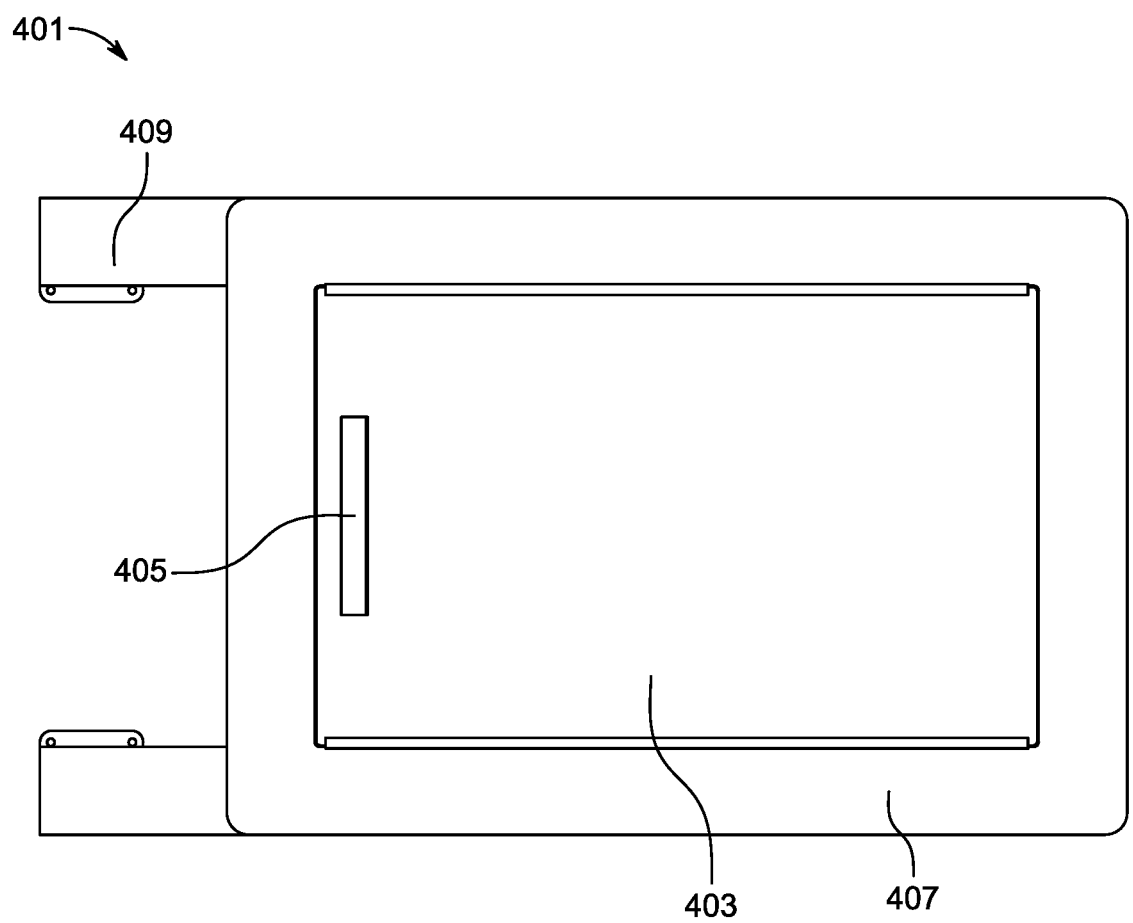
FIG. 4A is a front view of an alternative package delivery door in accordance with one or more aspects of the present application.
Figure 4B:
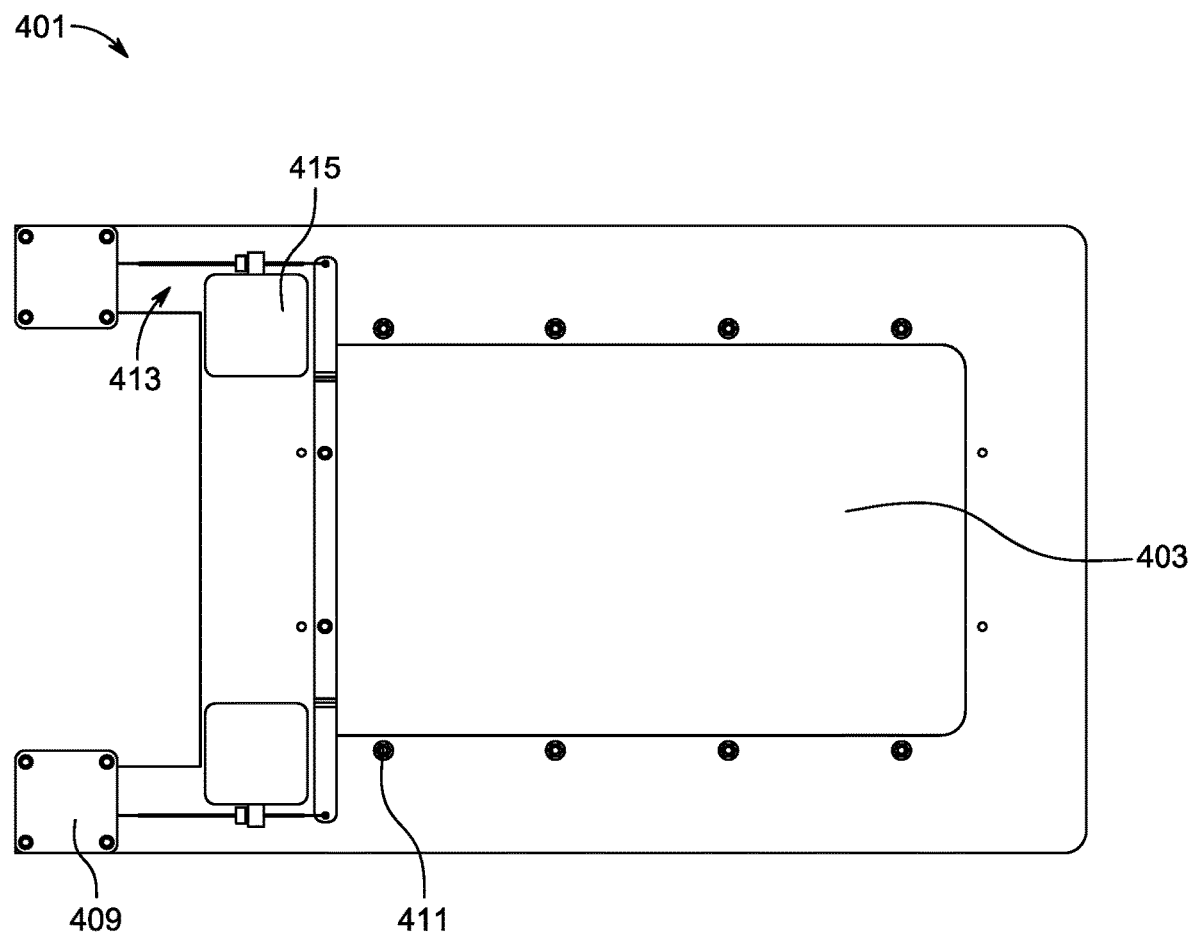
FIG. 4B is a rear view of an alternative package delivery door in accordance with one or more aspects of the present application.

In FIGS. 4A and 4B, front and rear views of an alternative package delivery door 401 are depicted, respectively. It should be appreciated that the package delivery door 401 may be implemented in the package delivery system 101.

The package delivery door 401 includes a door panel 403, a handle 405, an exterior frame 407, an interior frame 409, one or more fasteners 411, one or more locking mechanisms 413, and one or more controllers 415. The exterior frame 407 and the interior frame 409 are configured to allow the door panel 403 to slidably open and close along a horizontal axis for the insertion of one or more packages. The one or more locking mechanisms 413 are configured to lock and unlock the door panel 403.

It should be appreciated that the one or more fasteners 411 may include, without limitation, bolts, rivets, nails, screws, other fasteners, or any combination or multiplicity thereof.

It should also be appreciated that the one or more locking mechanisms 415 may include springs, wires, and/or other hardware suitable to lock and unlock the door panel 403.

The one or more controllers 415 are configured to direct the engagement and disengagement of the one or more locking mechanisms 413 based on communication received from the one or more user devices 107. It should be appreciated that the one or more controllers 415 may include one or more user settings (not shown) that a recipient can choose from to control timing of the engagement and disengagement of the one or more locking mechanisms 413. For example, a recipient may select an auto-lock setting that directs the one or more controller 415 to engage the one or more locking mechanisms 413 once the door panel 403 closes. In another example, a recipient may select a setting that directs the one or more controllers 415 to engage the one or more locking mechanisms 413 thirty seconds after the door panel 403 closes.

In some embodiments, it should be appreciated that during use, when a delivery person having the one or more user devices 107 is in proximity to the package delivery door 401, the one or more controllers 415 directs the one or more locking mechanisms 413 to disengage, thereby allowing the delivery person to open the package delivery door 401. The delivery person may insert one or more packages through the door panel 403 and then close the package delivery door 401. Once closed, the one or more controllers 415 direct the one or more locking mechanisms 413 to engage.

In alternative embodiments, it should be appreciated that during use, when a delivery person does not have the one or more user devices 107, the recipient may employ his or her user device, such as smart phone 107b, to remotely disengage the one or more locking mechanisms 413. Once the one or more locking mechanisms 413 are disengaged, the delivery person may open the package delivery door 401 and insert one or more packages through the door panel 403.

In some embodiments, it should be appreciated that during use, the recipient may require the delivery person to engage the one or more locking mechanisms 413 after delivering one or more packages through the package delivery door 401 via the one or more user devices 107.

Figure 5:
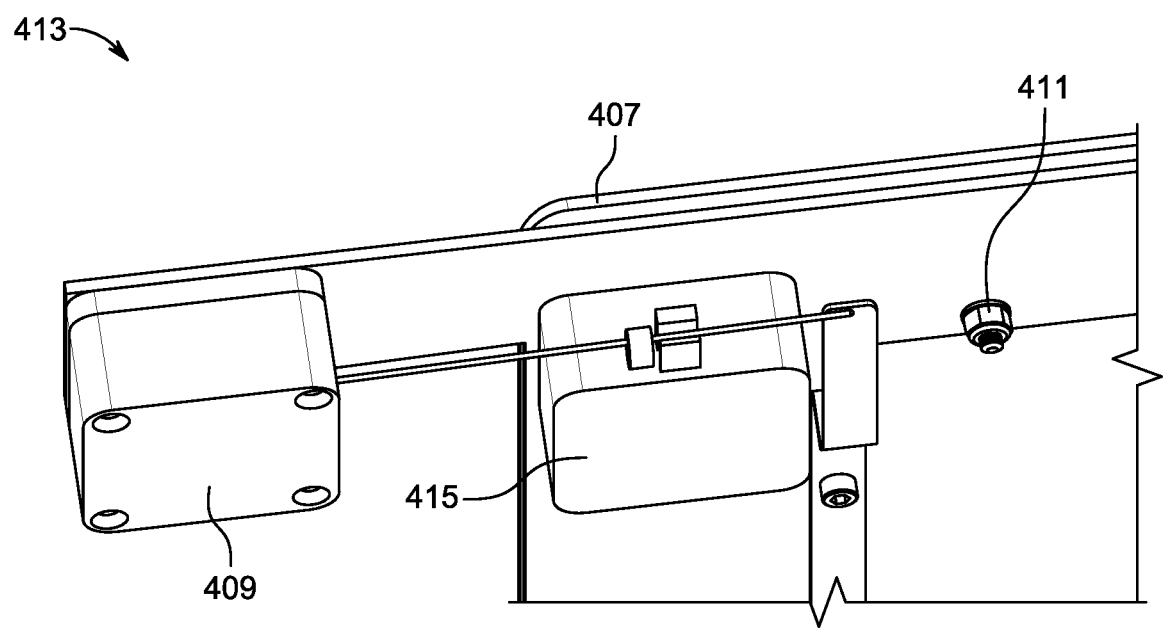
FIG. 5 is a detailed view of the locking mechanism of the package delivery door of FIGS. 4A and 4B.

In FIG. 5, a detailed view of the one or more locking mechanisms 415 is shown.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A package delivery system for secured delivery of packages without the need for a person to be present to accept them in person, comprising:
   a garage door;
   a package delivery door dispositioned within a thickness of the garage door, the package delivery door comprising:
      a door panel;
      a handle secured to the door panel;
      an exterior frame secured to the garage door;
      an interior frame;
      one or more fasteners;
   one or more locking mechanisms configured to lock and unlock the door panel, the one or more locking mechanisms is secured to the interior surface of the door panel and is configured to engage with the interior frame;
   a remote device;
   a controller, the controller having one or more user settings configured to disengage the one or more locking mechanisms for a predetermined amount of time, the controller is in data communication with the remote device and the one or more locking mechanisms, the remote device locks and unlocks the one or more locking mechanisms via the remote device; and
   wherein the exterior frame and the interior frame are configured to allow the door panel to slidably open and close along a horizontal axis for the insertion of one or more packages therethrough.

\* \* \* \* \*